May 8, 1962 L. J. VAN DE POLDER 3,033,921
DEVICE FOR CONVERTING A COLOR TELEVISION SIGNAL
Filed Dec. 9, 1959
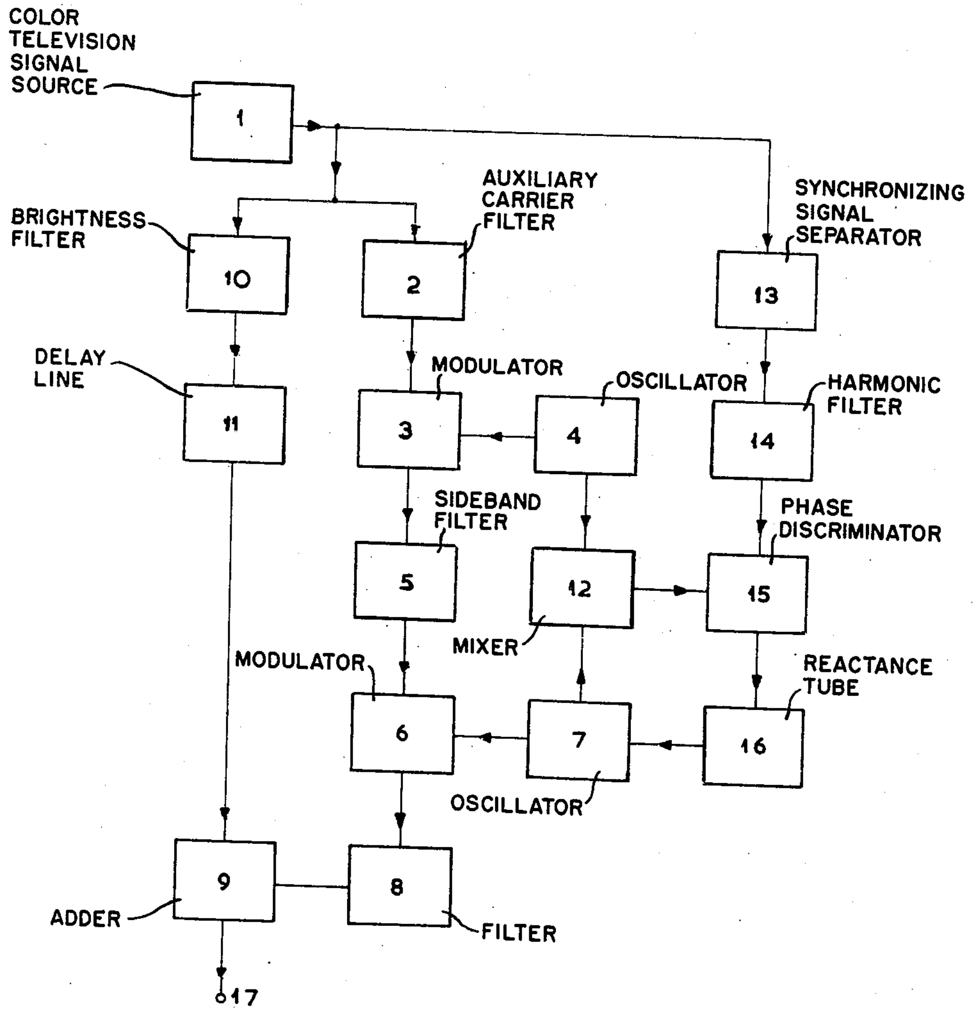
INVENTOR
L. J. VAN DE POLDER
BY
Frank R. Trifari
AGENT United States Patent Office 3,033,921

Patented May 8, 1962

3,033,921

DEVICE FOR CONVERTING A COLOR TELEVISION SIGNAL

Leendert Johan van de Polder, Eindhoven, Netherlands, assignor to North American Philips Company, Inc., New York, N.Y., a corporation of Delaware Filed Dec. 9, 1959, Ser. No. 858,401
Claims priority, application Netherlands Jan. 26, 1959
9 Claims. (Cl. 178—5.4)

The invention relates to devices for converting a color television signal of a definite standard into a signal of a different standard, which signal contains a component which mainly relates to the brightness of a scene and at least one component consisting of an auxiliary carrier wave modulated by one or more signals which relate to the color contents of that scene.

In a known color television system, the former component, the luminance signal, consists of a combination of three signals, the first of which relates to the green light components of the scene, the second to the red light components of the scene, and the third to the blue light components of the scene.

The second component consists of an auxiliary carrier wave which is modulated in quadrature by two signals which are likewise combinations of the three signals which relate to the green, red and blue light components respectively of the scene, which combinations, however, differ from one another and also from the combination of which the luminance signal consists.

At the same time, the signal transmitted in this known system contains the required synchronizing signals for the horizontal and vertical scannings, as well as a reference signal from which, in the receivers for the system, voltages are derived for the synchronous detection of the auxiliary carrier wave required in this system.

Due to the fact that for the transmission of television signals in general and of color television signals in particular, not everywhere the same transmission standards are used, it may be desirable to convert a signal, built up according to a first standard, into a signal built up according to a second standard.

A known method is to derive three signals from a first color television signal which relate respectively to the red, the green and the blue light components of the scene, and to produce each of these three signals on the screen of a picture tube. Each of those pictures is subsequently converted into a signal by means of suitable camera tubes of which line frequency and picture frequency correspond to the relative frequencies of the system of the second standard. The further handling of these three signals is likewise effected according to this standard which, in addition to prescriptions regarding line frequency and picture frequency, also gives prescriptions regarding the composition of the second component, the choice of the auxiliary carrier wave frequencies, the kind of modulation used in the transmission (for example positive or negative modulation) etc.

The invention relates in particular to the case that the first component, built up according to the one standard, is manipulated by a receiver for a system according to the other standard as a luminance signal for that receiver, that the second component is built up analogously in both systems, but that the frequencies of the used auxiliary carrier waves for the two systems are different.

The object of the present invention in such a case is to provide a device for converting a color television signal of a definite standard into a signal of a different standard while avoiding the use of three picture tubes and three camera tubes.

The device according to the invention is characterized in that the signal of the definite standard is supplied to a filter which removes the components consisting of a modulated auxiliary carrier wave from this signal, and to a filter which passes only one or more of these components, that the output signal of the latter filter is shifted in frequency with the aid of means suitable for that purpose, to that position in the frequency spectrum where the components consisting of a modulated auxiliary carrier wave are in the signal according to the other standard, and that the output signal of the former filter is combined with these components shifted in frequency via a delay circuit, the delay of which practically equals the difference between the delays occurring in the latter filter and the said means and that occurring in the former filter.

In order that the invention may be readily carried into effect, it will now be described in greater detail with reference to the accompanying drawing, the figure of which represents one embodiment of a device according to the invention.

In this picture, 1 represents the signal source of the signal according to a definite standard. It is assumed that this signal consists of a component which mainly relates to the brightness of a scene, and of a component consisting of an auxiliary carrier wave modulated in quadrature. The frame frequency of this signal is assumed to be 60 c./s., the number of lines from which a picture is built up is assumed to be 525, and the frequency of the auxiliary carrier wave is assumed to be $f_1=3.58$ mc./s. In addition, it is assumed that the frequency range occupied by the second component lies within the frequency range occupied by the first component.

As is known, $f_1$ is preferably chosen equal to an odd multiple of half the line frequency in order to reduce the disturbing phenomena between the two components. In this case, the line frequency amounts to 15,750 c./s.

Now this signal is to be converted into a color television signal, according to another standard, likewise consisting of a component which mainly relates to the brightness of a scene, and a component consisting of an auxiliary carrier wave modulated in quadrature. However, in this case, the frame frequency is assumed to be 50 c./s., the number of lines from which a picture is built up 625, and the frequency of the auxiliary carrier wave, for example, $f_2=4.43$ mc./s. If it is assumed, also in this case, that the frequency range occupied by the second component lies within the frequency range occupied by the first component, $f_2$ will also preferably be chosen equal to an odd multiple of half the line frequency. The line frequency of this signal according to this second standard amounts to 15,625 c./s.

It now appears that the first component, built up according to the first standard, can be excellently manipulated by a receiver for a system according to the second standard. This is linked up with the fact that a vertical scanning generator for 50 c./s. reacts equally well to synchronizing pulses having a recurrence frequency of 60 c./s. and that the difference in line frequency relatively is so slight that also the line scanning device is not affected perceptibly by the difference in line frequency.

At the same time it holds here that the second component is built up analogously in both cases, but that the frequencies of the used auxiliary carrier waves are different.

The output signal of the signal source 1 is supplied to a filter 10 which removes the second component from this signal so that at the output of this filter only the first component occurs, albeit that in this component the frequencies in the neighbourhood of the auxiliary carrier wave are lacking and to a filter 2 which removes the first component from this signal, so that at the output of this filter only the second component occurs, albeit that the frequencies of the first component in the neighbourhood of the auxiliary carrier wave are present here as disturbing elements. However, owing to the above choice of the auxiliary carrier wave frequency, the influence of these disturbing elements is slight.

The output signal of the filter 2 is supplied to a modulator 3 to which is also supplied a carrier wave with frequency $f_x$ originating from an oscillator 4.

The output signal of the modulator 3 is subsequently supplied to a filter 5 which passes, for example, the upper sideband of this signal. The auxiliary carrier wave of the second component is present herein as $f_x+f_1$.

This frequency $f_x$ is chosen so that the output signal of the filter 5 neither coincides in frequency with the frequency range of the second component according to the one standard nor coincides in frequency with the frequency range of the second component according to the other standard.

The said upper sideband is supplied to a modulator 6, to which is likewise supplied a carrier wave having frequency $f_x+f_1-f'_2$ originating from an oscillator 7.

Herein $f'_2$ is a frequency which approximately equals $f_2$, but which is an odd multiple of half the line frequency of the system according to the first standard.

That $f'_2$ should be approximately equal to $f_2$, will be clear: The receiver for the system according to the second standard being proportioned for the manipulation of a second component with an auxiliary carrier wave, the frequency of which equals $f_2$. The oscillator in such a receiver required for the demodulation of the auxiliary carrier wave modulated in quadrature which in principle ought to be synchronized at $f_2$, should also be capable of being synchronized at $f'_2$.

That $f'_2$ should also be equal to an odd multiple of half the line frequency of the system according to the first standard and can therefore in general not be chosen exactly equal to $f_2$ which equals an odd multiple of half the line frequency of the system according to the second standard, is linked up with the fact that the receiver for the system according to the second standard manipulates a signal of which line- and frame frequencies are those of the system according to the first standard, so that the auxiliary carrier wave converted in frequency should continue to maintain the said relationship with respect to the line frequency according to the first standard. It will be clear that these conditions, imposed on $f'_2$ will also preferably be fulfilled if the frequency range of the second component of the first standard does not coincide with the frequency range of the first component of the first standard in which it is consequently not necessary that $f_1$ equals an odd multiple of half the line frequency of the first standard.

It is noted that, if the frequency range of the second standard does not coincide with the frequency range of the first component of the second standard, $f'_2$ may in principle be chosen equal to $f_2$.

The output signal of the modulator 6 is supplied to a filter 8 which passes that part of this signal in which the auxiliary carrier wave is present as $f'_2$.

The signal occurring at the output of the filter 10 is supplied to a delay line 11 introducing into this signal a delay which, together with the delay of the filter 10, equals the delays introduced by the filters 2, 5 and 8.

Finally, the output signals of the delay line 11 and the filter 8 are combined in the addition device 3 at the output 17 of which a signal now occurs, the first component of which corresponds to the first component of the output signal of the signal source 1 and the second component of which is shifted through a frequency $f'_2-f_1$ with respect to the second component of the output signal of the signal source 1 and is suitable as such to be manipulated by a receiver according to the second standard.

In this connection it is noted that the reference signals present in the television signal for the demodulation of the auxiliary carrier wave modulated in quadrature which have the same frequency as the auxiliary carrier wave, are also converted automatically by the device according to the invention to signals having equal frequencies as the new auxiliary carrier wave, so that it is not necessary to take special measures for these reference signals.

It was stated above that $f_x$ is chosen so that the output signal of the filter 5 neither coincides in frequency with the frequency range of the second component according to the one standard, nor coincides in frequency with the frequency range of the second component according to the other standard.

A more specified condition in the choice of $f_x$ is that the frequency range occupied by the modulation products of $f_x$, $f_x+f_1-f'_2$ and the harmonics of these frequencies with the second component according to the one standard, the second component according to the other standard and the harmonics of these components preferably are as far remote as possible from the frequency range occupied by the second component according to the second standard.

For the rest the choice of $f_x$ is entirely free.

Since $f'_2-f_1$ is a given magnitude—for $f_1$ is determined by the system according to the first standard and $f'_2$ should approximately be equal to $f_2$ determined by the system according to the second standard and should in addition be equal to an odd multiple of half the line frequency of the system according to the first standard, it is recommendable to couple the oscillators 4 and 7 with each other. For that purpose, for example, a control oscillation, the frequency of which equals $f'_2-f_1$, is supplied to a phase discriminator 15 to which is supplied at the same time a signal, the frequency of which equals the frequency difference of the oscillations produced by the two oscillators. This signal is formed in the mixer stage 12. The output signal of the phase discriminator 15 is supplied to the control member 16 of the oscillator 7. This control member may be, for example, a reactance tube.

The phase of the oscillator 7 is chosen so that the phase characteristic of the transmission path, formed by the elements 2, 3, 5, 6 and 8, corresponds as well as possible to the phase characteristic of the transmission path formed by the elements 10 and 11.

Since both $f_1$ and $f'_2$ are equal to an odd multiple of half the line frequency of the system according to the first standard, and $f'_2-f_1$ consequently equals a multiple of this frequency, the said control oscillation may be derived in a simple manner from the line synchronizing pulses available in the signal of the first standard. In the example shown in the figure, the output signal of the source 1 is supplied to a device 13 separating the line-synchronizing signals from this signal. The line-synchronizing pulses occurring at the output of the device 13 are supplied to a device 14 which separates that harmonic of the line frequency which equals $f'_2-f_1$, and supplies this harmonic, after amplification, if any, as a control oscillation to the phase discriminator 15.

In the described example, the filter 5 passes the upper sideband of the output signal of the modulator 3. Naturally, a filter may be chosen which passes the lower sideband of this signal. In this lower sideband the auxiliary carrier wave of the second component is present as $f_x-f_1$. It will be clear that in this case the carrier wave supplied by the oscillator 7 will have to possess a frequency equalling $f_x+f'_2-f_1$.

If more than one component, consisting of an auxiliary carrier wave modulated by one or more signals which relate to the colour content of the scene, is available in the colour television signals, it will naturally be possible to convert each of these components in frequency, separately or collectively with the other of those components, in the above described manner.

What is claimed is:

1. A system for converting a color television signal of a first standard to a signal of a second standard, said first and second standards having luminance signals sufficiently similar to permit operation of a receiver according to the luminance requirements of both standards, said first and second standards also having auxiliary subcarrier waves modulated by color signals in analagous manners, said auxiliary subcarriers having different frequencies according to said two standards, said system comprising a source of color television signals of said first standard and having luminance signals and modulated auxiliary subcarrier signals, means separating said luminance and subcarrier signals, means shifting the frequency of said separated auxiliary subcarrier signal to a frequency that approximately corresponds to the auxiliary subcarrier frequency of said second standard, means delaying said separated luminance signal, and means combining said frequency shifted auxiliary subcarrier signal and said delayed luminance signal.

2. A system for converting a color television signal of a first standard to a signal of a second standard, said first and second standards having luminance signals sufficiently similar to permit operation of a receiver according to the luminance requirements of both standards, said first and second standards also having auxiliary subcarrier waves modulated by color signals in analagous manners, said auxiliary subcarriers having different frequencies according to said two standards, said system comprising a source of color television signals of said first standard and having luminance signals and modulated auxiliary subcarrier signals, means separating said luminance and subcarrier signals, first modulator means, a source of first oscillations, means applying said separated subcarrier signals and said first oscillations to said first modulator means, sideband filter means connected to the output of said first modulator means, second modulator means, a source of second oscillations, means applying the output of said sideband filter means and said second oscillations to said second modulator means, output filter means connected to the output of said second modulator means, means delaying said separated luminance signal, and means combining said delayed luminance signal and the output of said output filter means.

3. The system of claim 2, in which said sideband filter means is an upper sideband bandpass filter, the frequency $f$ of said second oscillations being equal to:

$$f=f_x+f_1-f'_2$$

wherein $f_x$ is the frequency of said first oscillations, $f_1$ is the frequency of the auxiliary subcarrier wave of said first standard, and $f'_2$ is a frequency approximately equal to the subcarrier frequency of said second standard.

4. The system of claim 2, in which said sideband filter means is a lower sideband bandpass filter, the frequency $f$ of said second oscillations being equal to:

$$f=f_x-f_1+f'_2$$

wherein $f_x$ is the frequency of said first oscillations, $f_1$ is the frequency of the auxiliary subcarrier wave of said first standard, and $f'_2$ is a frequency approximately equal to the subcarrier frequency of said second standard.

5. The system of claim 2, in which said first oscillations have such a frequency that the sidebands of the output of said first modulator means fall outside of the frequency bands of the modulated subcarrier waves according to said first and second standards.

6. A system for converting a color television signal of a first standard to a signal of a second standard, said first and second standards having luminance signals sufficiently similar to permit operation of a receiver according to the luminance requirements of both standards, said first and second signals also having auxiliary subcarrier waves modulated by color signals in analagous manners, said auxiliary subcarriers having different frequencies according to said two standards, the auxiliary subcarrier of said first system having a frequency equal to an odd multiple of half the line frequency of the first standard, said system comprising a source of color television signals of said first standard having luminance and modulated auxiliary subcarrier signals, means separating said luminance and subcarrier signals, means shifting the frequency of said separated subcarrier signal to a frequency that approximately corresponds to the auxiliary subcarrier frequency of said second standard and that is an odd multiple of half the line frequency of said first standard, means delaying said separated luminance signal, and means combining said frequency shifted subcarrier signal and said delayed luminance signal.

7. A system for converting a color television signal of a first standard to a signal of a second standard, said first and second standards having luminance signals sufficiently similar to permit operation of a receiver according to the luminance requirements of both standards, said first and second signals also having auxiliary subcarrier waves modulated by color signals in analagous manners, said auxiliary subcarriers having different frequencies according to said two standards, the auxiliary subcarrier of said first system having a frequency equal to an odd multiple of half the line frequency of the first standard, said system comprising a source of color television signals of said first standard having luminance and modulated auxiliary subcarrier signals, means separating said luminance and subcarrier signals, first and second modulator means, a source of first oscillations, means applying said first oscillations and said separated subcarrier signal to said first modulator means, sideband filter means connected to the output of said first modulator means, a source of second oscillations having a frequency equal to the sum of the frequency of said first oscillations and a difference frequency, said difference frequency being the difference between the frequency of the subcarrier of the first standard and another frequency that is an odd multiple of half the line frequency of the first standard and approximately equal to the subcarrier frequency of the second standard, means applying the output of said sideband filter means and said second oscillations to said second modulator means, output filter means connected to the output of said second modulator means, means delaying said separated luminance signal, and means combining said delayed luminance signal and the output of said output filter means.

8. A system for converting a color television signal of a first standard to a signal of a second standard, said first and second standards having luminance signals sufficiently similar to permit operation of a receiver according to the luminance requirements of both standards, said first and second signals also having auxiliary subcarrier waves modulated by color signals in analagous manners, said auxiliary subcarriers having different frequencies according to said two standards, the auxiliary subcarrier of said first system having a frequency equal to an odd multiple of half the line frequency of the first standard, said system comprising a source of color television signals of said first standard having luminance and modulated auxiliary subcarrier signals, means separating said luminance and subcarrier signals, a first and second modulator means, a source of first oscillations, means applying said first oscillations and said separated subcarrier signal to said first modulator means, sideband filter means connected to the output of said first modulator means, a source of second oscillations, means applying the output of said filter means and said second oscillations to said second modulator means, output filter means connected to said second modulator means, means delaying said separated luminance signals, means combining the delayed luminance signal and the output of said output filter means, means providing a difference oscillation having a frequency that is the difference between the subcarrier frequency of said first standard and a frequency approximately equal to the subcarrier frequency of said second standard that is also an odd multiple of half the line frequency of said first standard, said second oscillations having a frequency equal to the sum of the frequencies of said first oscillation and said difference oscillation frequency, means combining said first and second oscillations, means comparing said combined first and second oscillations with said difference oscillations to provide a control voltage, and means controlling the frequency of said second oscillations in response to said control voltage.

9. The system of claim 8, in which said means providing a difference oscillation comprises means deriving a line synchronizing pulse from said color television signal, and harmonic filter means connected to said pulse deriving means.

References Cited in the file of this patent

UNITED STATES PATENTS 2,828,354 Haantjes et al. ---------- Mar. 25, 1958